(12) United States Patent
Kim et al.

(10) Patent No.: US 8,035,760 B2
(45) Date of Patent: Oct. 11, 2011

(54) LIQUID CRYSTAL DISPLAY

(75) Inventors: Young Sik Kim, Gyeongsangbuk-do (KR); Kyo Seop Choo, Gyeonggi-do (KR); Tae Hwan Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 275 days.

(21) Appl. No.: 12/256,094

(22) Filed: Oct. 22, 2008

(65) Prior Publication Data

US 2009/0185095 A1 Jul. 23, 2009

(30) Foreign Application Priority Data

Oct. 22, 2007 (KR) .................. 10-2007-0106046

(51) Int. Cl.
*G02F 1/1335* (2006.01)
(52) U.S. Cl. ............................................... 349/12
(58) Field of Classification Search .......... 349/106, 349/110, 12, 145
See application file for complete search history.

(56) References Cited

U.S. PATENT DOCUMENTS

| | | | |
|---|---|---|---|
| 6,888,604 B2 * | 5/2005 | Rho et al. ................. | 349/146 |
| 7,649,578 B2 * | 1/2010 | Kwon et al. .............. | 349/12 |
| 7,671,833 B2 * | 3/2010 | Lee et al. .................. | 345/104 |
| 7,800,717 B2 * | 9/2010 | Kuribayashi et al. ..... | 349/109 |
| 2006/0139503 A1 * | 6/2006 | Larson et al. ............. | 349/39 |

* cited by examiner

*Primary Examiner* — James Dudek
(74) *Attorney, Agent, or Firm* — Morgan, Lewis & Bockius LLP

(57) ABSTRACT

A liquid crystal display capable of improving a color reproduction range is disclosed. The liquid crystal display includes a liquid crystal panel having a plurality of gate lines and a plurality of data lines which cross each other to define a plurality of unit pixel regions; a first pixel region having a first dot pitch among individual pixel regions in at least one of the unit pixel regions; and a second pixel region having a second dot pitch among the individual pixel regions in the unit pixel regions, wherein the first and second dot pitches of the first and second pixel regions are different from each other. By this configuration, the pixel electrodes are formed to have the same opening ratio in the individual pixel regions forming a unit pixel by changing the shape and size of the pixel electrodes in a region having a sensor and a region without a sensor, thereby improving a color reproduction range and improving the display quality of the liquid crystal display.

6 Claims, 8 Drawing Sheets

LIQUID CRYSTAL DISPLAY

CROSS-REFERENCE TO RELATED APPLICATION

This application claims the benefit of Korean Patent Application No. 10-2007-106046, filed on Oct. 22, 2007, which is hereby incorporated by reference in its entirety as if fully set forth herein.

BACKGROUND OF THE INVENTION

1. Field of the Invention

The present invention relates to a liquid crystal display, and more particularly to a liquid crystal display capable of improving a color reproduction range.

2. Discussion of the Related Art

Generally, flat plate displays include a liquid crystal display, a field emission display, a plasma display panel, a light emitting device and the like.

The liquid crystal display displays an image by adjusting a light transmittance of liquid crystal using an electric field. For this, an image display device includes a display panel having liquid crystal cells, a back light unit which illuminates light on the display panel and a driving circuit for driving the liquid crystal cells.

The display panel is formed to define a plurality of unit pixel regions by crossing a plurality of gate lines and a plurality of data lines. In each pixel region, there are provided a thin film transistor array substrate and a color filter array substrate facing each other, spacers positioned between two substrates to maintain a specific cell gap, and liquid crystal filled in the cell gap.

The thin film transistor array substrate includes gate lines and data lines, thin film transistors formed as switch devices at crossing portions of the gate lines and the data lines, pixel electrodes connected to the thin film transistors in respective liquid crystal cells, and an orientation film coated thereon. The gate lines and data lines are supplied with signals from driving circuits through respective pads.

The thin film transistors supply pixel voltage signals, which are supplied to the data lines, to the pixel electrodes in response to scan signals supplied to the gate lines.

The color filter array substrate includes color filters formed in the respective liquid crystal cells, black matrices for distinguishing the color filters from each other and reflecting outside light, common electrodes which commonly supply reference voltages to the liquid crystal cells, and an orientation film coated thereon.

After the separately manufactured thin film transistor array substrate and color filter array substrate are arranged, the substrates are bonded to face each other. Then, the liquid crystal is injected therein and sealed, thereby accomplishing the liquid crystal display.

A method for reproducing colors in the liquid crystal display device employs a pixel structure in which a color filter region corresponding to the red (R), green (G) and blue (B) of three primary colors of light is defined as one dot, transmittance of white light is adjusted while passing through a liquid crystal layer, and light passes through individual red (R), green (G) and blue (B) pixels, thereby representing various colors. The individual red (R), green (G) and blue (B) pixels can represent various colors by combination of RGB.

Figure 1:
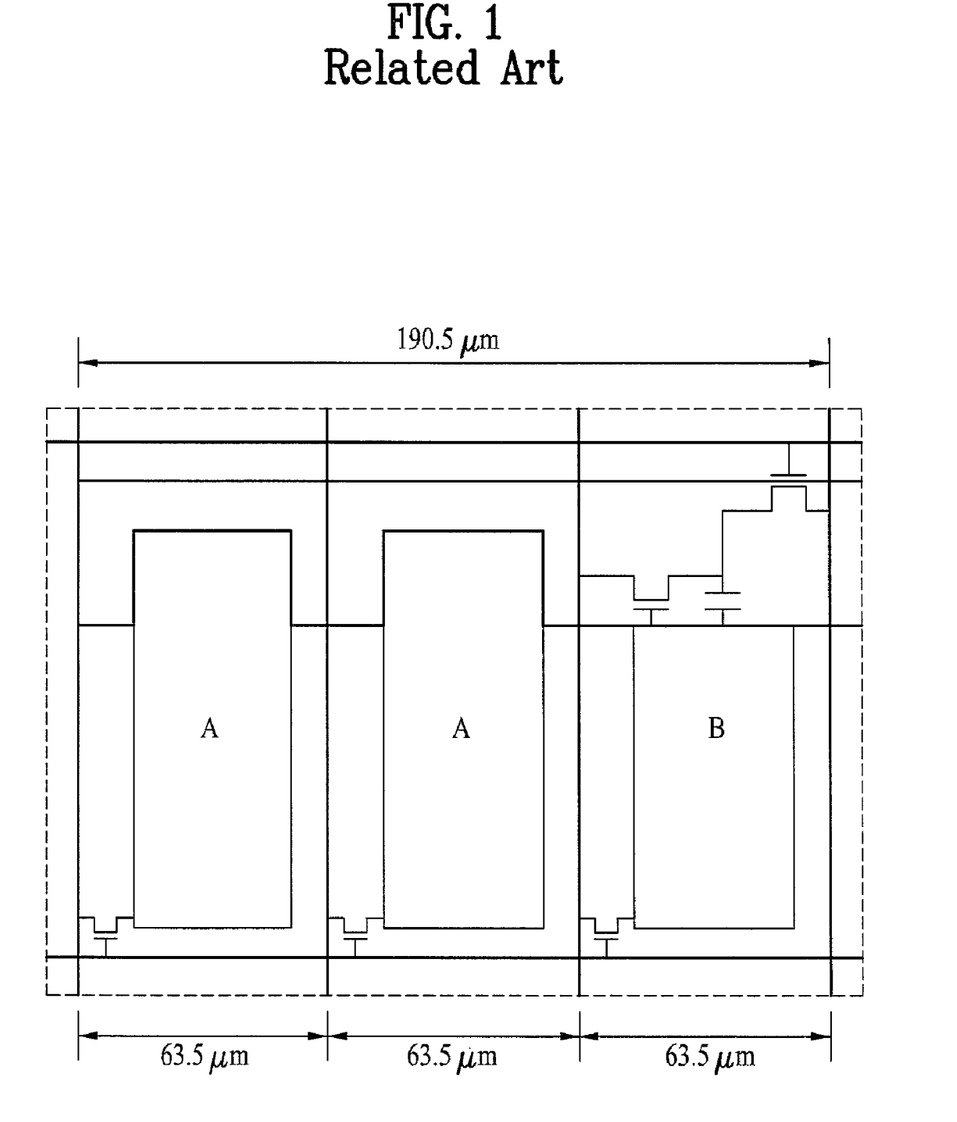
FIG. 1 illustrates a unit pixel having a sensor in a conventional liquid crystal display.

FIG. 1 illustrates RGB individual pixels in a unit pixel having a sensor among 4×4 pixels in a conventional liquid crystal display.

As shown in FIG. 1, in a case of a 7" WVGA liquid crystal display, a unit pixel has a dot pitch of 190.5 μm, and the individual red (R), green (G) and blue (B) pixels forming the unit pixel have a dot pitch of 63.5 μm. In this case, as for the size of pixel electrodes in the individual red (R), green (G) and blue (B) pixels, the pixel electrode in a pixel without a sensor has an area A, whereas the pixel electrode in a pixel having a sensor has an area B. Accordingly, it causes a difference in an opening ratio of the individual pixels.

As a result of measuring a color reproduction range in unit pixel regions having a difference in an opening ratio, a unit pixel without a sensor represents normal brightness (color), i.e., R (255 grey)+G (255 grey)+B (255 grey)=W (255 grey), whereas a unit pixel having a sensor cannot represent a desired color, i.e., R (255 grey)+G (255 grey)+B (250 grey) =Yellowish White (less than 255 grey).

Accordingly, in the individual pixels having the same dot pitch, since color mixture is not properly made due to a difference in an opening ratio of the unit pixel without a sensor and the unit pixel having a sensor, it is difficult to accurately represent colors. Thus, there is a problem of deteriorating image quality in the liquid crystal display.

Further, in a case where one or more individual pixels include a sensor in the liquid crystal display having a sensor, the reduction of image quality becomes severer.

SUMMARY OF THE INVENTION

Accordingly, the present invention is directed to a liquid crystal display that substantially obviates one or more problems due to limitations and disadvantages of the related art.

An object of the present invention is to provide a liquid crystal display capable of improving a color reproduction range.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display comprises: a liquid crystal panel having a plurality of gate lines and a plurality of data lines which cross each other to define a plurality of unit pixel regions; a first pixel region having a first dot pitch among individual pixel regions in at least one of the unit pixel regions; and a second pixel region having a second dot pitch among the individual pixel regions in the unit pixel regions, wherein the first and second dot pitches of the first and second pixel regions are different from each other.

The unit pixel regions forming the liquid crystal panel have the same dot pitch.

The first and second pixel regions have the same opening ratio.

The first and second pixel electrodes of the first and second pixel regions have the same shape or different shapes.

The first and second pixel electrodes of the first and second pixel regions have the same area.

Each of the unit pixel regions includes red (R), green (G) and blue (B) pixels.

The first and second pixel regions are formed as any one of red (R), green (G) and blue (B) pixels.

According to the present invention, the pixel electrodes are formed to have the same opening ratio in the individual pixel regions forming a unit pixel by changing the shape and size of the pixel electrodes in a region having a sensor and a region without a sensor, thereby improving a color reproduction range and improving the display quality of the liquid crystal display.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

Figure 2:
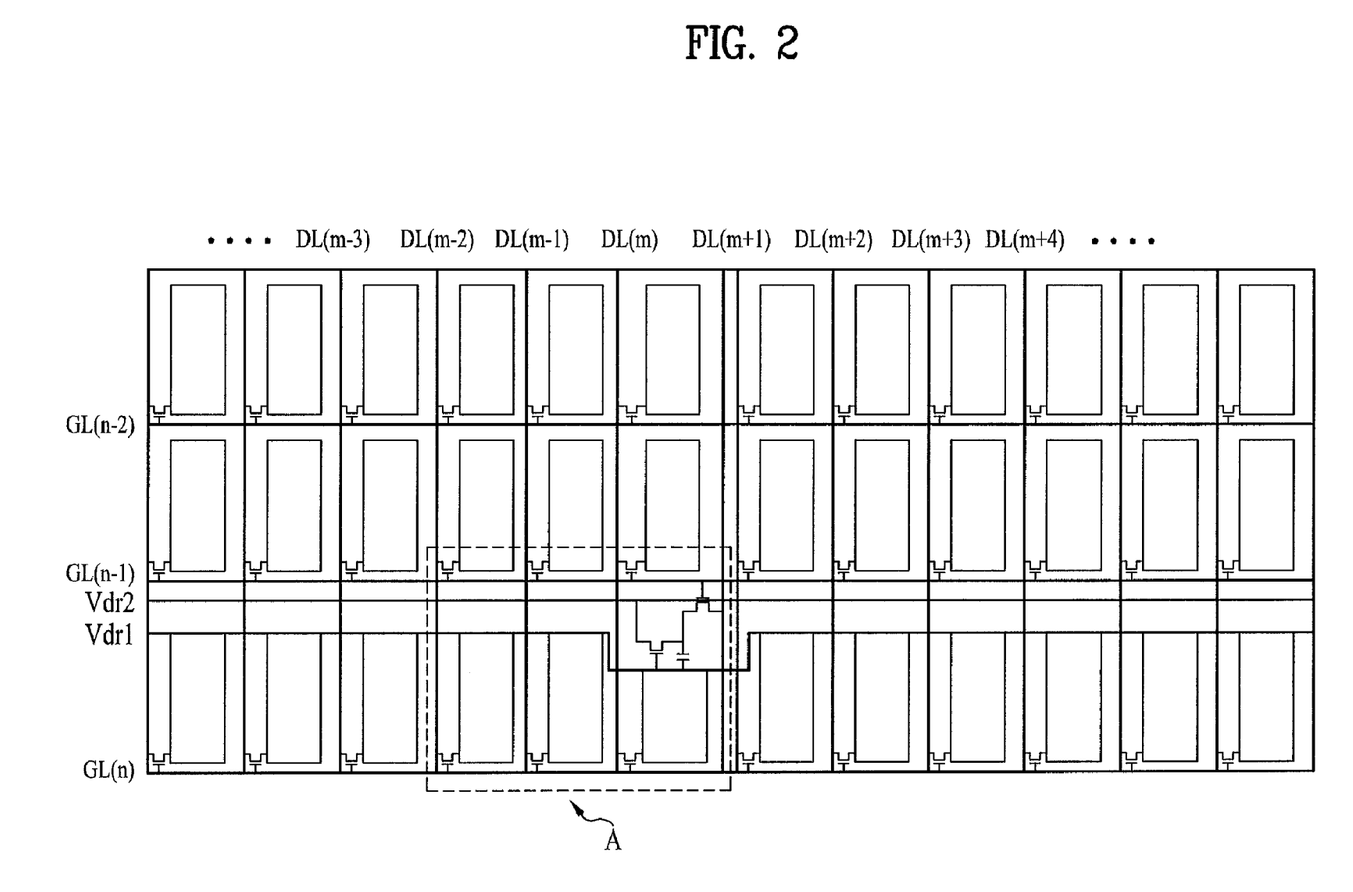
FIG. 2 illustrates a liquid crystal display according to embodiments of the present invention.
Figure 3:
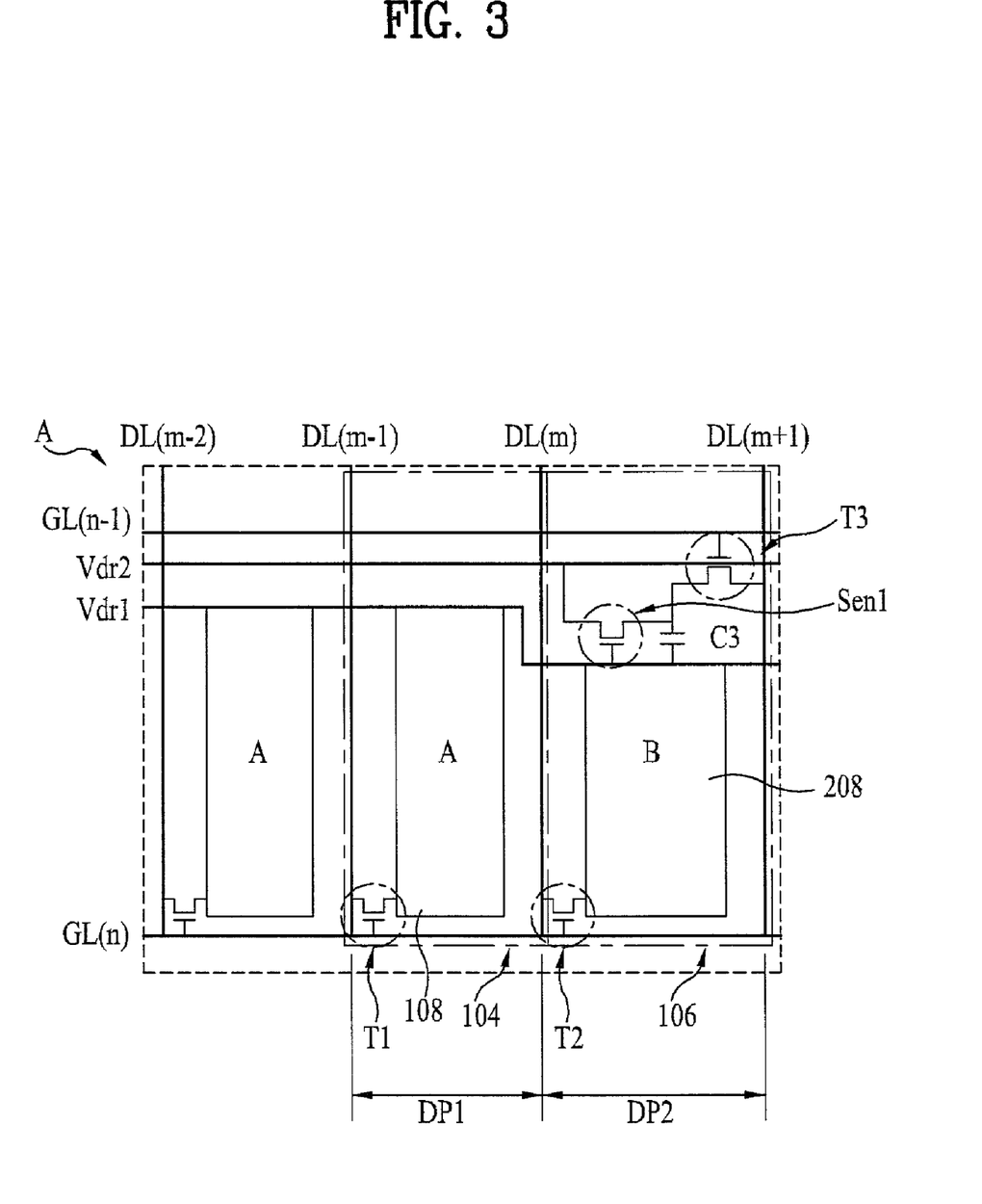
FIG. 3 illustrates a unit pixel region A of a liquid crystal display according to a first embodiment of the present invention.

FIG. 2 illustrates a liquid crystal panel of a liquid crystal display according to the embodiments of the present invention. FIG. 3 illustrates a unit pixel region of the liquid crystal display according to a first embodiment of the present invention.

Referring to FIGS. 2 and 3, the liquid crystal display includes a liquid crystal panel 102 having a plurality of gate lines GL(1) to GL(n) and a plurality of data lines DL(1) to DL(m) which cross each other to define a plurality of unit pixel regions, a first pixel region 104 having a first dot pitch DP1 among individual pixel regions in each unit pixel region A of the liquid crystal panel, and a second pixel region 106 having a second dot pitch DP2 among the individual pixel regions in each unit pixel region A. The first and second dot pitches DP1 and DP2 of the first and second pixel regions 104 and 106 are different from each other.

The liquid crystal panel 102 includes a plurality of individual pixel regions in which the gate lines GL(1) to GL(n) and the data lines DL(1) to DL(m) cross each other to display an image. Each of the individual pixel regions B is formed as any pixel of red (R), green (G) and blue (B) pixels. The individual pixel regions B form a plurality of unit pixel regions by setting red (R), green (G) and blue (B) pixels as one unit.

Referring to FIG. 3, the unit pixel region A having a sensor among the unit pixel regions includes the first pixel region 104 having the first dot pitch DP1 and the second pixel region 106 having the second dot pitch DP2. In this case, the unit pixel region A includes red (R), green (G) and blue (B) pixels. Further, the first and second dot pitches DP1 and DP2 of the first and second pixel regions 104 and 106 are different from each other.

Figure 4:
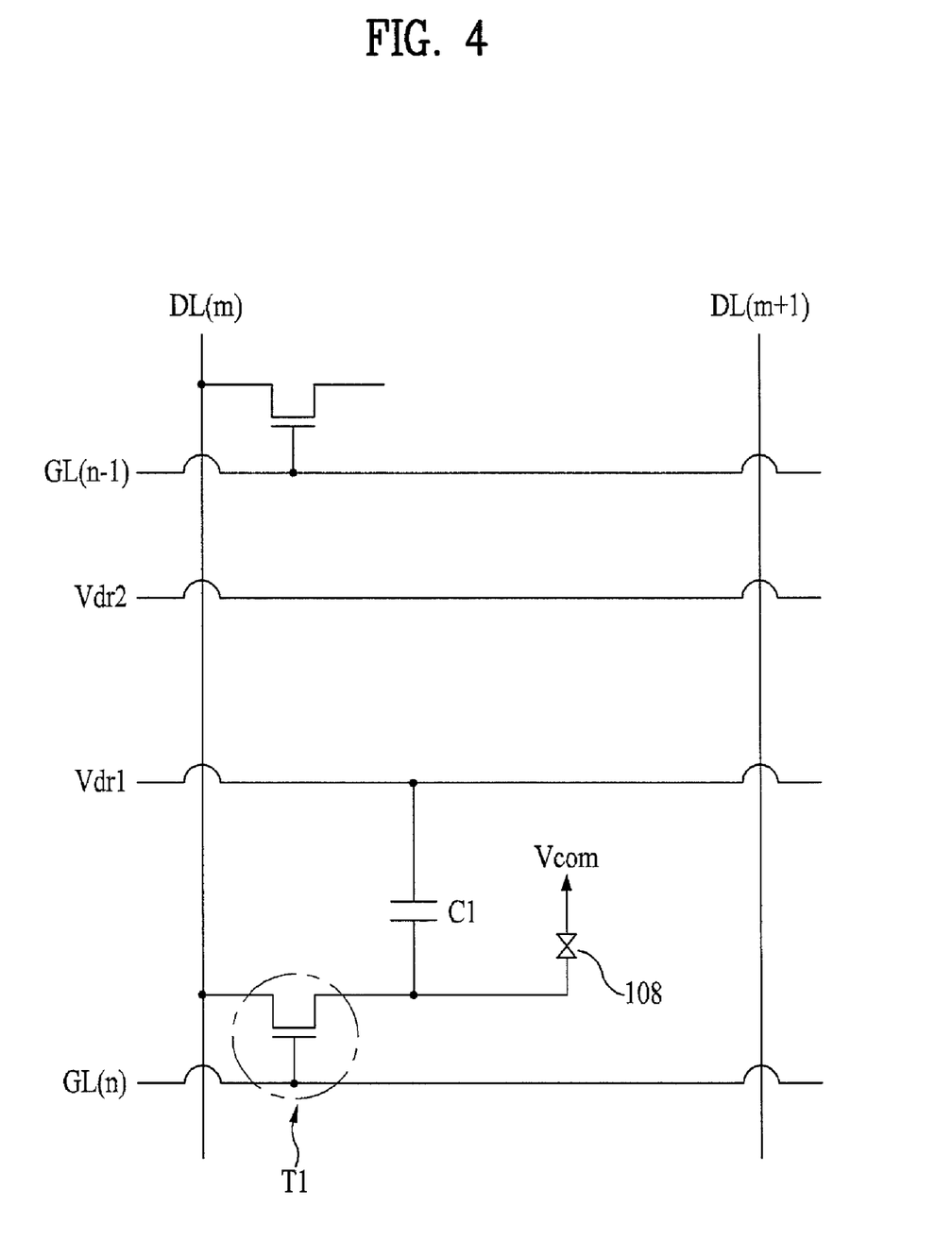
FIG. 4 illustrates a circuit diagram showing a first pixel region of the liquid crystal display according to the first embodiment of the present invention.

As shown in FIG. 4, the first pixel region 104 includes a first thin film transistor T1 formed at a crossing portion of the gate line GL(n) and the data line DL(m), a first pixel electrode 108 having a first area and driven by the first thin film transistor T1, and a first capacitor C1 which stores a voltage charged in the first pixel electrode 108.

Figure 5:
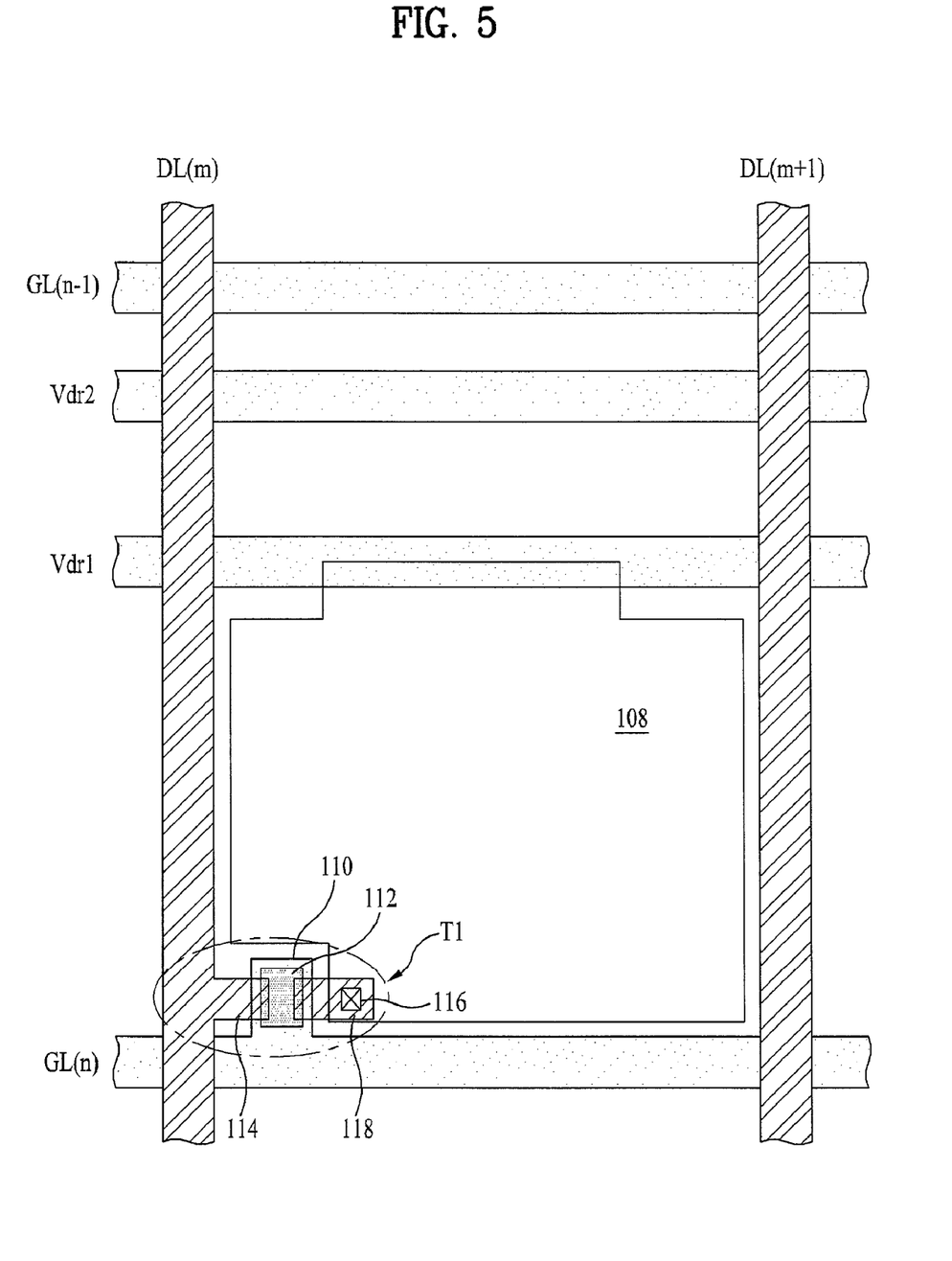
FIG. 5 illustrates a plan view showing the first pixel region of the liquid crystal display according to the first embodiment of the present invention.

As shown in FIG. 5, the first thin film transistor T1 includes a first gate electrode 110 extended from the gate line GL(n), a first semiconductor layer 112 which overlaps with the first gate electrode 110 while a gate insulating film (not shown) is interposed therebetween, a first source electrode 114 which is electrically connected to the first semiconductor layer 112 and extended from the data line DL(m), and a first drain electrode 118 which faces the first source electrode 114 and is connected to the first pixel electrode 108 via a first contact hole 116. In this case, an ohmic contact layer (not shown) for ohmic contact may be formed between the first semiconductor layer 112, the first source electrode 114 and the first drain electrode 118. The first drain electrode 118 of the first thin film transistor T1 may be formed in a "U" shape, thereby achieving a large channel region.

The first capacitor C1 includes a first lower electrode extended from a first driving voltage supply line Vdr1 and an upper electrode that is the first pixel electrode 108 overlapping with the first lower electrode while a gate insulating film (not shown) is interposed therebetween.

Figure 6:
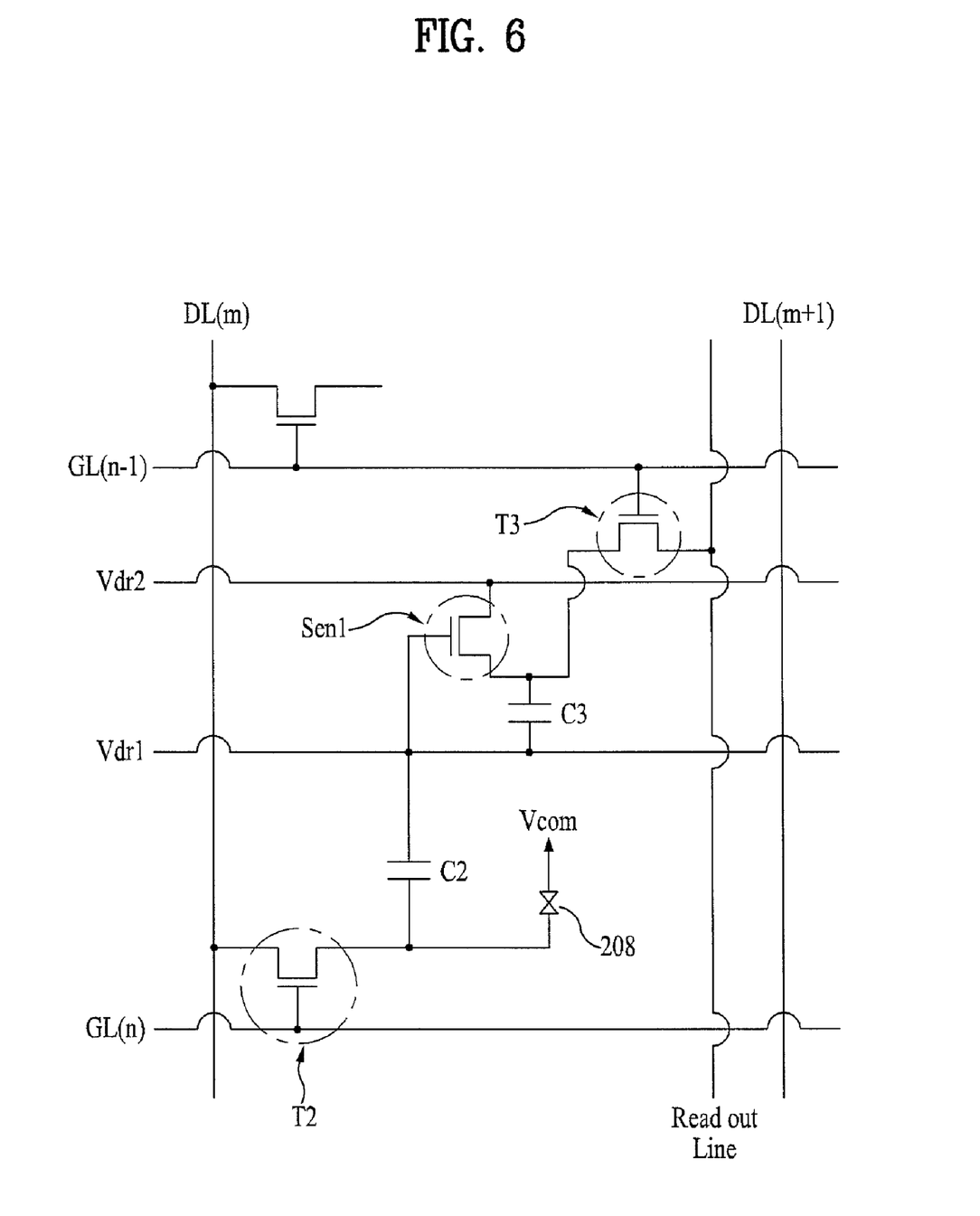
FIG. 6 illustrates a circuit diagram showing a second pixel region of the liquid crystal display according to the first embodiment of the present invention.

As shown in FIG. 6, the second pixel region 106 includes a second thin film transistor T2 formed at a crossing portion of the gate line GL(n) and the data line DL(m), a second pixel electrode 208 having a second area and driven by the second thin film transistor T2, a second capacitor C2 which stores a pixel voltage charged in the second pixel electrode 208, a sensor Sen1 for sensing light from the outside at one region of the second pixel region 106, a first driving voltage supply line Vdr1 which is parallel to the gate line GL(n) and supplies a first driving power supplied through the second thin film transistor T2 to the sensor Sen1, a second driving voltage supply line Vdr2 which is parallel to the first driving voltage supply line Vdr1 and supplies a second driving power to the sensor Sen1, a third capacitor C3 which stores a signal sensed by the sensor Sen1, a third thin film transistor T3 which is connected to the third capacitor C3 and the previous gate line GL(n−1) and transmits a signal sensed by the sensor Sen1, and a read-out line which transmits the signal sensed by the sensor Sen1 to the outside through the third thin film transistor T3.

Figure 7:
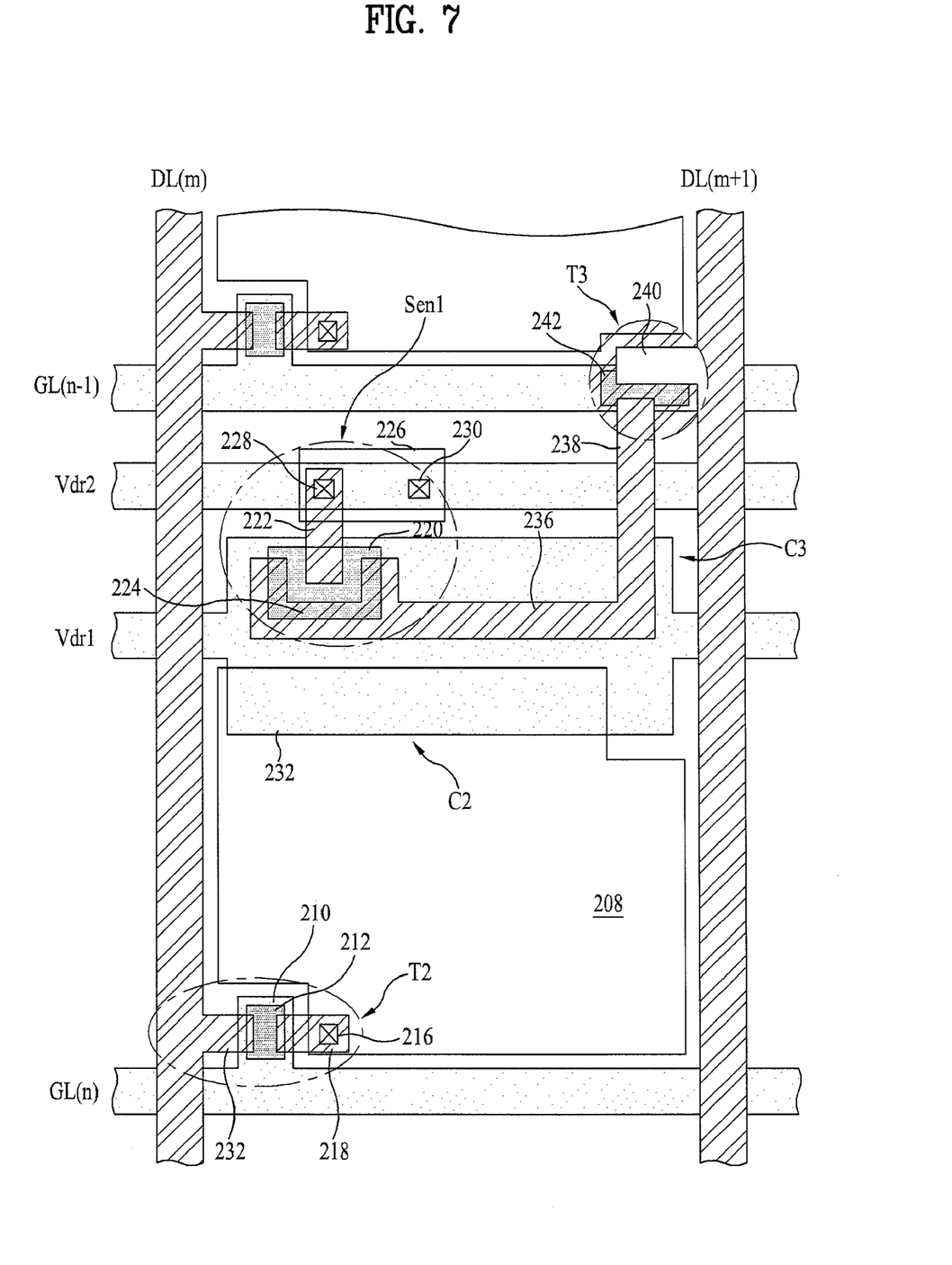
FIG. 7 illustrates a plan view showing the second pixel region of the liquid crystal display according to the first embodiment of the present invention.

As shown in FIG. 7, the second thin film transistor T2 includes a second gate electrode 210 extended from the gate line GL(n), a second semiconductor layer 212 which overlaps with the second gate electrode 210 while a gate insulating film (not shown) is interposed therebetween, a second source electrode 214 which is electrically connected to the second semiconductor layer 212 and extended from the data line DL(m), and a second drain electrode 218 which faces the second source electrode 214 and is connected to the second pixel electrode 208 via a second contact hole 216. In this case, an ohmic contact layer (not shown) for ohmic contact may be formed between the second semiconductor layer 212, the second source electrode 214 and the second drain electrode 218. The second drain electrode 218 of the second thin film transistor T2 is formed in a "U" shape, thereby achieving a large channel region.

The second capacitor C2 includes a second lower electrode 232 extended from the first driving voltage supply line Vdr1 and an upper electrode that is the second pixel electrode 208 overlapping with the second lower electrode 232 while a gate insulating film (not shown) is interposed therebetween.

The sensor Sen1 includes a third gate electrode 218 extended from the first driving voltage supply line Vdr1, a third semiconductor layer 220 which overlaps with the second gate electrode 218 while a gate insulating film (not shown) is interposed therebetween, a source electrode 222 which is electrically connected to the third semiconductor layer 220 and connected to the second driving voltage supply line Vdr2 through a third contact hole 228, a drain electrode 224 which faces the source electrode 222, and a first transparent electrode 226 which electrically connects the second driving voltage supply line Vdr2 to the source electrode 222 through a fourth contact hole 230 for exposing the second driving voltage supply line Vdr2 and a fifth contact hole 228 for exposing the source electrode 222. In this case, the drain electrode 224 of the sensor Sen1 is formed in a "U" shape, thereby achieving a large channel region for receiving light.

A third capacitor C3 includes the first and second driving voltage supply lines Vdr1 and Vdr2 serving as a third lower electrode and an third upper electrode 236 while a gate insulating film (not shown) is interposed therebetween. In this case, the third lower electrode is the first and second driving voltage supply lines Vdr1 and Vdr2, and the third upper electrode 236 is connected to the drain electrode 224 of the sensor Sen1 and the source electrode 238 of a third thin film transistor T3, thereby forming the third capacitor C3. In this case, the third capacitor C3 may be formed as at least three capacitors C3.

The third thin film transistor T3 includes a third gate electrode (not shown) which is a portion of the previous gate line GL(n−1), a third source electrode 238 connected to the third lower electrode 236 of the third capacitor C3, a third drain electrode 240 which faces the third source electrode 238, and a third semiconductor layer 242 which overlaps with the third gate electrode to form a channel between the third source electrode 238 and the third drain electrode 240.

The liquid crystal display according to the first embodiment of the present invention is explained again with reference to FIG. 3. In a case of a 7" WVGA liquid crystal panel, a unit pixel region has a total dot pitch of 195.2 μm. In this case, in each unit pixel region including red (R), green (G) and blue (B) individual pixel regions, the pixel electrodes 108 and 208 of the red (R), green (C) and blue (B) individual pixel regions overlap with the first driving voltage supply line Vdr1, and the pixel electrodes 108 and 208 are formed to have first and second areas.

In a case where the pixel electrodes 108 and 208 having the first and second areas are formed in the first and second individual pixel regions 104 and 106, the first and second pixel regions 104 and 106 have different dot pitches DP1 and DP2 in the first and second pixel regions 104 and 106 in order to form the same size of the pixel electrodes 108 and 208 without changing the dot pitch of the unit pixel region A.

In other words, in order to increase the size of the pixel electrode in the second pixel region 106, which is reduced by the Sen1 for sensing light from the outside, the third capacitor C3 for storing a signal sensed by the sensor Sen1, and the third thin film transistor T3 which transmits the signal sensed by the sensor Sen1, the dot pitch DP1 of the first pixel region 104 without the sensor is decreased, and the dot pitch DP2 of the second pixel region 106 is increased, thereby forming both the pixel electrode 108 of the first pixel region 104 and the pixel electrode 208 of the second pixel region 106 to have same size. In this case, the pixel electrodes 108 and 208 of the first and second pixel regions 104 and 106 have different shapes.

Then, the first and second pixel electrodes 108 and 208 having the same size and different shapes are formed to have the same opening ratio in the individual pixel regions 104 and 106, thereby improving a color reproduction range and improving the display quality of the liquid crystal display by appropriately mixing colors having the same brightness when the liquid crystal display is driven.

Figure 8:
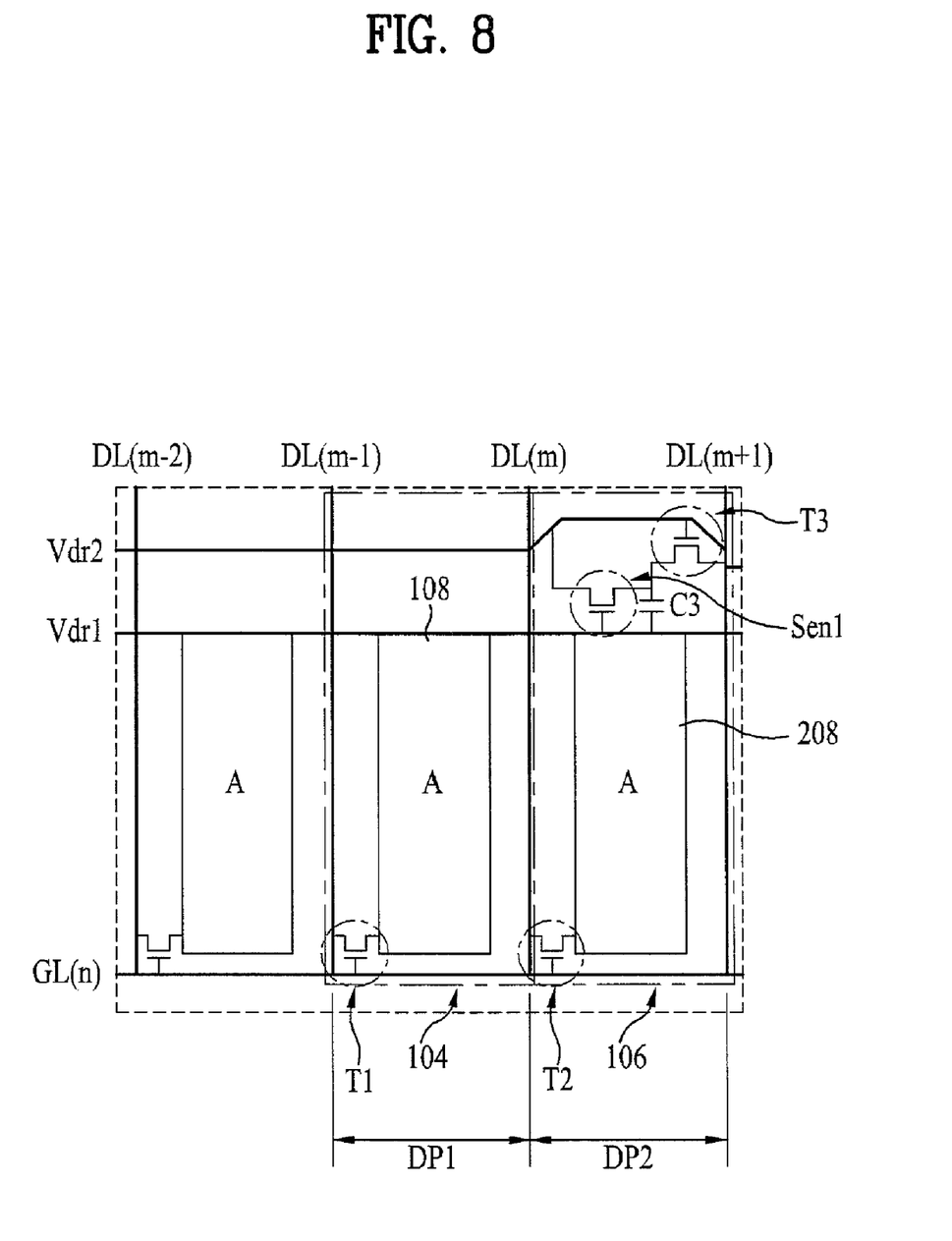
FIG. 8 illustrates a unit pixel region of a liquid crystal display according to a second embodiment of the present invention.

FIG. 8 illustrates a liquid crystal display according to a second embodiment of the present invention.

Referring to FIG. 8, in the liquid crystal display according to the second embodiment of the present invention, in a case of a 7" WVGA liquid crystal panel having the same conditions as in the first embodiment, a unit pixel region has a total dot pitch of 195.2 μm. In this case, in each unit pixel region including the red (R), green (G) and blue (B) individual pixel regions, the pixel electrodes of the red (R), green (C) and blue (B) individual pixel regions overlap with the first driving voltage supply line Vdr1, and the pixel electrodes 108 and 208 are formed to have first and second areas of the same area. In this case, the first and second pixel regions 104 and 106 are formed to have different dot pitches DP1 and DP2.

In other words, in order to arrange the Sen1 for sensing light from the outside, the third capacitor C3 for storing a signal sensed by the sensor Sen1, and the third thin film transistor T3 which transmits the signal sensed by the sensor Sen1 in the second pixel region 106, the first and second pixel regions 104 and 106 are formed to have the same size by reducing the size of a pixel region (not shown) disposed at the upper side of the second pixel region 106. In this case, the pixel electrodes 108 and 208 of the first and second pixel regions 104 and 106 have the same shape.

Then, the first and second pixel electrodes 108 and 208 having the same shape and the same size are formed to have the same opening ratio in the individual pixel regions, thereby improving a color reproduction range and improving the display quality of the liquid crystal display by appropriately mixing colors having the same brightness when the liquid crystal display is driven.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A liquid crystal display comprising:
   a liquid crystal panel having a plurality of gate lines and a plurality of data lines which cross each other to define a plurality of unit pixel regions;

a first pixel region having a first dot pitch among individual pixel regions in at least one of the unit pixel regions; and a second pixel region having a second dot pitch among the individual pixel regions in the unit pixel regions, wherein the second pixel region includes a sensor for sensing light from an outside;

wherein the first and second dot pitches of the first and second pixel regions are different from each other such that the first and second pixel regions have the same opening ratio;

wherein a first pixel electrode of the first pixel region and a second pixel electrode of the second pixel region have the same shape;

wherein the first and second pixel electrodes of the first and second pixel regions have the same area.

2. The liquid crystal display according to claim 1, wherein the unit pixel regions forming the liquid crystal panel have the same dot pitch.

3. The liquid crystal display according to claim 1, wherein the first pixel region includes:

a first thin film transistor formed at a crossing portion of the gate lines and the data lines;

a first capacitor which stores a voltage charged in the first pixel electrode;

wherein the first pixel electrode of the first pixel region is driven by the first thin film transistor.

4. The liquid crystal display according to claim 1, wherein the second pixel region includes:

a second thin film transistor formed at a crossing portion of the gate lines and the data lines;

a second capacitor which stores a pixel voltage charged in the second pixel electrode;

a first driving voltage supply line which is parallel to the gate lines and supplies a first driving power supplied through the second thin film transistor to the sensor;

a second driving voltage supply line which is parallel to the first driving voltage supply line and supplies a second driving power to the sensor;

a second capacitor which stores a signal sensed by the sensor;

a third thin film transistor which is connected to the second capacitor and a previous gate line and transmits a signal sensed by the sensor; and a read-out line which transmits the signal sensed by the sensor to the outside through the third thin film transistor;

wherein the second pixel electrode of the second pixel region is driven by the second thin film transistor;

wherein the sensor is positioned at one region of the second pixel region.

5. The liquid crystal display according to claim 1, wherein each of the unit pixel regions includes red (R), green (G) and blue (B) pixels.

6. The liquid crystal display according to claim 1, wherein the first and second pixel regions are formed as any one of red (R), green (C) and blue (B) pixels.

* * * * *